3,021,859
DIAPHRAGM CONSTRUCTION

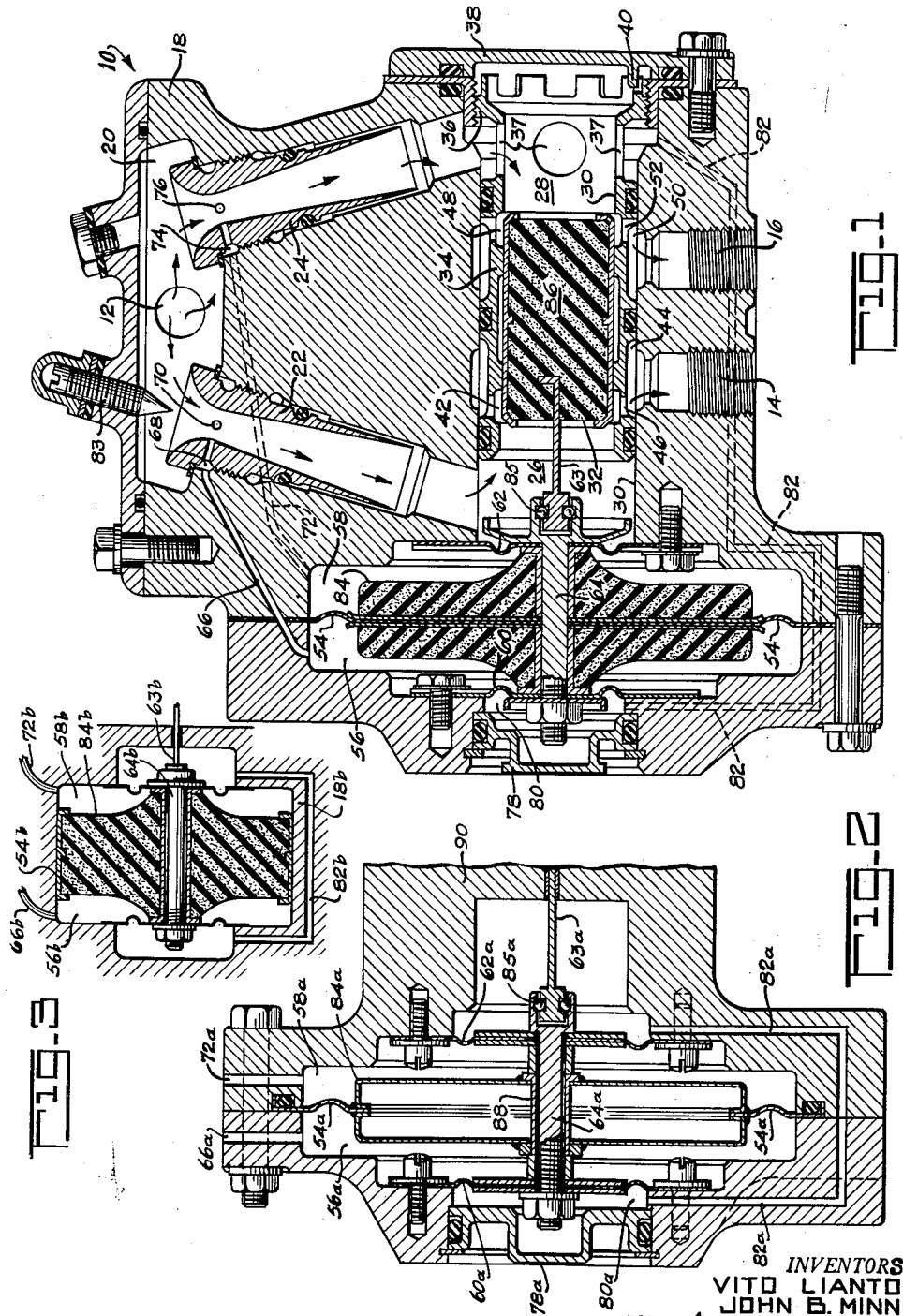

Vito Liantonio, Passaic, and John B. Minnich, Glen Rock, N.J., assignors to Curtiss-Wright Corporation, a corporation of Delaware
Filed Mar. 23, 1956, Ser. No. 573,488
8 Claims. (Cl. 137—101)

This invention relates to control and/or measuring mechanism and is particularly directed to such mechanism having a flexible diaphragm or other movable wall means arranged to be submerged in a liquid.

In prior art control or measuring mechanism having a flexible diaphragm it is known to pre-stress the flexible diaphragm to balance the weight of the diaphragm and parts supported thereby so that said weight centers the diaphragm. Such diaphragm mechanism is currently used in aircraft engine carburetors or in other aircraft fuel control systems. Said prior construction is effective to eliminate the effect of the weight the flexible diaphragm and parts connected thereto in only one attitude of the mechanism. An object of the present invention comprises the provision of a control or measuring mechanism in which the effect of the weight of the flexible diaphragm or other movable wall and parts supported thereby are eliminated in all attitudes of the mechanism. A further object of the invention comprises the provision of a control or measuring mechanism having a flexible diaphragm member or other movable wall member together with a float member such that said members are submerged in liquid and the weight of the liquid displaced by said members is at least substantially equal to the weight of said members.

Other objects of the invention will become apparent upon reading the annexed detailed description in connection with the drawing in which:

FIG. 1 is an axial sectional view through a control mechanism embodying the invention;

FIG. 2 is a view of a modified construction for the flexible diaphragm portion of FIG. 1; and FIG. 3 is a view similar to FIG. 2 but illustrating a further modification of the invention.

Referring first to FIG. 1, there is illustrated a control mechanism 10 for controlling the division of fuel flow between a supply passage 12 to which fuel is supplied under pressure and a pair of outlet passages 14 and 16. The mechanism 10 is designed to equally divide the fuel flow between two groups of cylinders of an aircraft internal combustion engine. As will become apparent, however, the invention is not limited to this specific use and instead is of general application.

As illustrated the mechanism 10 comprises a housing 18 having an inlet port 20 communicating with the inlet or supply passage 12. A pair of identical venturi tubes 22 and 24 have their upstream ends communicating with the inlet port 20. The downstream ends of the venturi tubes 22 and 24 communicate with the opposite ends 26 and 28 respectively of a cylindrical bore 30. A balanced type slide valve 32 is mounted for sliding movement within a sleeve 34 positioned within said bore. The sleeve 34 is adjustably anchored at one end by screw threads 36 so as to provide for initial adjustment of the position of said sleeve and said sleeve end has holes 37 to provide communication between the venturi tube 24 and the end 28 of the bore 30. The end 28 of the bore 30 is closed by a cover 38 having a lug 40 interlocked with a notched end of the sleeve 34 to lock the sleeve in position.

One end of the sleeve 34 has an internal annular groove 42 arranged to communicate with the end 26 of the bore 30. The internal groove 42 communicates with an external groove 44 in said sleeve, via one or more radial holes 46, and said external groove 44 communicates with the outlet passage 14. Similarly the other end of the sleeve 34 has an internal annular groove 48 arranged to communicate with the end 28 of the bore 30. The internal groove 48 communicates with an external groove 50 in the sleeve 34, via one or more radial holes 52 and said external groove 50 communicates with the outlet passage 16. The valve 32 is positioned within the sleeve 34 so as to control the flow from the two ends of the bore 30 into the annular internal grooves 42 and 48 whereby the axial position of said valve determines the division of flow between the outlets 14 and 16.

The housing 18 also has a flexible diaphragm 54 which functions as a movable wall to divide a portion of said housing into a pair of chambers 56 and 58. The remote walls of said chambers are closed by relatively small flexible diaphragms 60 and 62 of the same effective area and a bolt 64 co-axially connects the flexible diaphragms 54, 60 and 62 together. The small flexible diaphragm 62 also separates the chamber 58 from the adjacent end 26 of the cylindrical bore 30. The chamber 56 communicates with the throat of the venturi tube 22 via a passage 66, annular groove 68 and one or more holes 70 to the throat of said tube. The chamber 58 communicates with the throat of the venturi tube 24 via a passage 72, annular groove 74 and one or more holes 76 to the throat of the tube 24. The effective areas of the small diaphragms 60 and 62 to the fluid pressures acting thereon and the effective areas of the two ends of the valve 32 to the fluid pressures acting thereon are all equal. A cap 78 is disposed adjacent to the flexible diaphragm 60 to provide a closed space 80 therebetween. A passage 82 interconnects the closed space 80 with the end 28 of the bore 30 so that the fluid pressure forces against the two remote ends of the movable diaphragm and valve system balance each other. As illustrated, the passage 82 is connected to the bottom sides of the end space 80 and end space 28. To prevent entrapment of air in said spaces another passage (not shown) may be provided to interconnect the top sides of said end spaces.

An adjustable needle valve 83 is provided to compensate for any differences in the two venturi tubes 22 and 24.

With the aforedescribed construction of the control mechanism 10 any difference in the liquid fuel flow through the two venturi tubes 22 and 24 results in a difference in the suction pressures at the throats of said tubes thereby unbalancing the pressures, in the chambers 56 and 58, acting against the flexible diaphragm 54 whereupon said diaphragm moves in such a direction that the valve 32 is moved thereby to rebalance said flow. For example, should the flow through the venturi tube 24 increase above that through the venturi tube 22, the pressure in the chamber 58 thereupon drops below that in the chamber 56. This pressure difference in the chambers 56 and 58 moves the diaphragm 54 to the right (as viewed in the drawing) against the elasticity of said diaphragm to move the valve 32 to the right. Movement of the valve 32 restricts the flow into the annulus 48 from the adjacent end 28 of the bore 30 and at the same time opens the valve flow area from the end 26 of the bore 30. In this way the valve 32 moves to the right to decrease the flow through the venturi tube 24 and increase the flow through the venturi tube until a flow balance is again established.

For high accuracy the flexible diaphragm 54 and valve 32 should respond to small pressure differences across the diaphragm 54. If the control mechanism 10 always remains in one position the weight of its moving parts can be accurately balanced so that said weight does not adversely affect the operation of the mechanism. Where, however, the control mechanism is used in aircraft it obviously is not sufficient to simply balance the weight of the parts in one position. In accordance with the present invention a float member 84 is immersed in the liquid filling the liquid chambers 56 and 58. The float member 84 is co-axial with and is connected to the diaphragm 54 and bolt 64.

The float member 84 is sufficiently light and is of such size that the liquid displaced by said float member 84, the flexible diaphragm 54 and the movable parts supported by said diaphragm is approximately equal to the weight of said parts. The valve stem 63 has a push-pull connection with the bolt 64, as provided by a snap ring 85, so that a part of the weight of the stem 63 is also supported by the flexible diaphragm 54 and therefore is included in the parts supported by and movable with the flexible diaphragm which together with the float member displace liquid approximately equal to the weight of said parts. With this construction the weight of the flexible diaphragm 54 and the weight of the movable parts supported thereby have no effect on the position of the movable diaphragm 54 even though the attitude of the mechanism 10 changes, as may occur in the case of an aircraft control mechanism.

The float member 84 is made of a rigid expanded material having a substantially closed cellular structure and/or an imperforate outer surface so that it absorbs little or none of the liquid within which it is to be immersed. The material of the float member 84 also should have a low enough density to provide the necessary buoyant force without requiring too large a float member. Various expanded plastic materials are available having such properties. The material of the float member obviously must be resistant against attack by the particular liquid within which it is to be immersed and must be rigid enough so that the material does not collapse under the pressure of said liquid. Expanded phenolic resins or expanded rubber and phenolic resins usable in fuels and oils, such as are currently being used for floats in carburetors are suitable. Other expanded plastics are also available. The particular material used, however, will depend on the particular liquid and the pressure of the liquid within which it is to be immersed.

The valve member 32 is slidably disposed within the sleeve 34 which in turn is disposed within the bore 30 so that said valve member in effect is immersed in the liquid within said bore. The valve member 32 also has a light weight construction. For this purpose the valve member may comprise a thin annular sheet metal shell, filled with a suitable cellular rigid material 86, such as that of the float 84, to give the valve member 32 the required rigidity. The adjacent end of the valve stem 63 may be anchored by embedding it in material 86 as illustrated. Also the valve 32 is made light enough in weight so that the weight of the liquid displaced by the valve 32 and the portion of the valve stem 63 supported by the valve is approximately equal to the weight of said parts. With this construction the weight of the valve and valve stem also has no effect on the operation of the control mechanism even though the attitude of said mechanism changes, as in the case of an aircraft control.

The float member 84 instead of being made of a rigid expanded resin material could have a hollow metal construction. Such a modification is illustrated in FIG. 2. The flexible diaphragm mechanism illustrated in FIG. 2 is essentially like that of FIG. 1 and for ease of understanding the parts of FIG. 2 have been designated by the same reference numerals but with a subscript $a$ added thereto as the corresponding parts of FIG. 1.

In FIG. 2 the float member 84a comprises a hollow metal body to which the flexible diaphragm 54a is secured. The bolt 64a extends through an opening in the float member 84a and a sleeve 88 disposed about the bolt 64a is welded to the adjacent edges of said opening in the float member to seal said opening and to give the adjacent portions of the walls of the float member the required rigidity. Another difference in FIG. 2 is that the operating stem 63a is supported by a closing wall structure 90 instead of being directly connected to a flexible diaphragm member such as the valve 32 of FIG. 1, to be controlled thereby. Except for these differences the flexible diaphragm structure of FIG. 2 is essentially like that of FIG. 1. Accordingly no further description of FIG. 2 appears necessary.

In FIG. 1, the pressure responsive movable wall separating the liquid pressure chambers 56 and 58 has been illustrated as a flexible diaphragm 54. The flexible diaphragm 54 positively prevents leakage from one of said chambers to the other. FIG. 2 has a similar flexible diaphragm construction. In an application where a small amount of leakage between said pressure chambers is not objectionable the movable wall separating said chambers could comprise a floating piston instead of a flexible diaphragm. Such a modification is schematically illustrated in FIG. 3. The parts of FIG. 3 have been designated by the same reference numerals as the corresponding parts of FIG. 1 but with a subscript $b$ added thereto.

In FIG. 3 the piston 54b has a sliding fit within a cylindrical bore in the housing 18b so that said piston comprises a movable wall which divides said bore into a chamber 56b and 58b. Thus the piston 54b in effect is immersed in the liquid supplied to the chambers 56b and 58b. The piston 54b has a lightweight construciton which, as illustrated, comprises a sheet metal annulus with a core 84b of lightweight rigid cellular material such as that of the float 84 or the core 86 of the valve 32. The piston 54b is of sufficient size so that the weight of the liquid displaced by said piston and the parts movable with and supported by the piston is approximately equal to the weight of said piston and parts.

Except for the above described differences the pressure responsive movable wall structure of FIG. 3 is essentially like that of FIGS. 1 and 2. Accordingly no further description of FIG. 3 appears necessary.

Throughout the foregoing descriptions the fluid pressures have been described as liquid pressures and the fluid being controlled has been described as a liquid. It should be apparent, however, that the invention is also applicable to gaseous fluids. In the case of gaseous fluids, however, the size of the float required to provide the required buoyant force may become quite large.

While we have described our invention in detail in its present preferred embodiment, it will be obvious to those skilled in the art, after understanding our invention, that various changes and modifications may be made therein without departing from the spirit or scope thereof. We aim in the appended claims to cover all such modifications.

We claim as our invention:

1. A mechanism comprising a housing; means including a flexible diaphragm and float member dividing said housing into a pair of chambers, said float member being connected to the center of said diaphragm so that said diaphragm extends radially outwardly from the periphery of said float member; and means for supplying a liquid to each of said chambers so that said diaphragm and float member are immersed in said liquid, the weight of the liquid displaced by said diaphragm and float member being at least substantially equal to the weight of said diaphragm and float member.

2. A mechanism comprising a housing; means including a movable flexible diaphragm and float member dividing said housing into a pair of chambers; said float member being connected to the center of said diaphragm so that said diaphragm extends radially outwardly from the periphery of said float member; and separate passage means for each of said chambers for supplying liquid to said chambers so that said diaphragm and float member are submerged in liquid and are movable in response to relative changes in the fluid pressures in said chambers, the weight of the liquid displaced by said diaphragm and float member being at least substantially equal to the weight of said diaphragm and float member.

3. A control mechanism comprising a housing; means including a movable wall dividing said housing into a pair of chambers; means for supplying liquid to each of said chambers so that said wall is movable in response to relative changes in the liquid pressures in said chambers; a liquid flow control valve member; and means connecting said valve member to said movable wall for movement thereby, the liquid pressure forces on said valve means being substantially balanced so that said movable wall and the valve means connected thereto are movable substantially solely in response to unbalance of the liquid pressure forces on said wall, said movable wall, valve member and connecting means being immersed in liquid and said wall and valve member having a float construction so that the weight of the liquid displaced by said movable wall, valve member and connecting means is substantially equal to the weight of said parts.

4. A control mechanism comprising a housing; means including a flexible diaphragm and float member dividing said housing into a pair of chambers, said float member being connected to the center of said diaphragm so that said diaphragm extends radially outwardly from the periphery of said float member; means for supplying liquid to each of said chambers so that said diaphragm and float member are movable in response to relative changes in the liquid pressures in said chambers; a liquid flow control valve member; and means connecting said valve member to said diaphragm and float member for movement thereby, the liquid pressure forces on said valve member being substantially balanced so that said flexible diaphragm and valve member connected thereto are movable substantially solely in response to unbalance of the liquid pressure forces on said diaphragm, said float member, diaphragm, valve member and connecting means being immersed in liquid and said valve member and float member both being sufficiently light so that the weight of the liquid displaced by said float member, diaphragm, valve member and connecting means is substantially equal to the weight of said parts with the weight of the liquid displaced by said valve member being substantially equal to the weight of said valve member.

5. Liquid flow dividing mechanism comprising a housing having an inlet port, a pair of outlet ports and a chamber; means including a movable wall dividing said chamber into two portions; means for supplying liquid to each of said chamber portions so that said wall is immersed in said liquid and is movable in response to relative changes in the liquid pressure in said chamber portions; and valve means connected to said movable wall for movement therewith for controlling the division of flow from said inlet port to said outlet ports, the liquid pressure forces on said valve means being substantially balanced so that said movable wall and the valve means connected thereto are movable substantially solely in response to unbalance of the liquid pressure forces on said wall, said wall and valve means having a float construction so that the weight of the liquid displaced by said wall and valve means is at least substantially equal to the weight of said wall and valve means.

6. Liquid flow dividing mechanism comprising a housing having first and second chambers, an inlet port, a pair of passageways each communicating at one end with said inlet port and at the other end with said first chamber and each having a venturi-type portion; a pair of outlet ports, one for each of said passageways; a valve member slidable in said first chamber for controlling communication of each passageway with its associated outlet port such that motion of the valve member in one direction increases the communication of one passageway with its outlet port and decreases the communication of the other passageway with its outlet port and motion of the valve member in the opposite direction has the reverse effect; a movable wall member dividing said second chamber into opposed chamber portions and operatively connected to said valve member for moving said valve member to control the division of flow to said outlet ports; passage means connecting one of said chamber portions to the throat of one of said venturi portions and connecting the other of said chamber portions to the throat of the other of said venturi portions such that upon unbalance of the pressures in said chamber portions said movable wall member is effective to move said valve member in a direction to restore balance of the pressures in said chamber portions; said movable wall member and valve member each having a lightweight construction and being of such size that the weight of the liquid displaced by each said member is at least substantially equal to the weight of said member.

7. Condition control mechanism comprising a housing; movable wall means dividing said housing into a pair of chambers; means for supplying liquid to each of said chambers so that said movable wall means is immersed in said liquid and is movable in response to relative liquid pressure changes in said chambers, at least a portion of said movable wall means having a float construction so that the weight of the liquid displaced by said movable wall means is at least equal to the weight of said movable wall means; and means connected to said wall means for movement in response to said liquid pressure changes for controlling said condition.

8. A mechanism comprising a housing; means including a movable flexible diaphragm dividing said housing into a pair of chambers; means for supplying a liquid to each of said chambers so that said diaphragm is movable in response to relative liquid pressure changes in said chambers; and a float member rigidly connected directly to said diaphragm so that said diaphragm extends radially outwardly from the periphery of said float member, said diaphragm and float member being immersed in said liquid and the weight of the liquid displaced by said diaphragm and float member being at least equal to the weight of said diaphragm and float member.

References Cited in the file of this patent

UNITED STATES PATENTS

| | | |
|---|---|---|
| 962,111 | Assmann | June 21, 1910 |
| 1,948,044 | Myers et al. | Feb. 20, 1934 |
| 2,207,840 | Tornquist | July 16, 1940 |
| 2,472,056 | Otis | May 31, 1949 |
| 2,623,083 | Schlumberger et al. | Dec. 23, 1952 |
| 2,643,664 | Willett | June 30, 1953 |
| 2,772,065 | Thomas | Nov. 27, 1956 |

FOREIGN PATENTS

| | | |
|---|---|---|
| 599,012 | Great Britain | Mar. 3, 1918 |
| 588,585 | Great Britain | May 28, 1947 |